(12) United States Patent  (10) Patent No.: US 11,249,651 B2
Salamat et al.  (45) Date of Patent: Feb. 15, 2022

(54) SYSTEM AND METHOD FOR HIERARCHICAL SORT ACCELERATION NEAR STORAGE

(71) Applicant: Samsung Electronics Co., Ltd., Suwon-si (KR)

(72) Inventors: Sahand Salamat, San Bruno, CA (US); Hui Zhang, San Jose, CA (US); Joo Hwan Lee, San Jose, CA (US); Yang Seok Ki, Palo Alto, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 38 days.

(21) Appl. No.: 16/821,811

(22) Filed: Mar. 17, 2020

(65) Prior Publication Data

US 2021/0124500 A1  Apr. 29, 2021

Related U.S. Application Data

(60) Provisional application No. 62/927,626, filed on Oct. 29, 2019.

(51) Int. Cl.
*G06F 3/06* (2006.01)

(52) U.S. Cl.
CPC .......... *G06F 3/0613* (2013.01); *G06F 3/0638* (2013.01); *G06F 3/0679* (2013.01)

(58) Field of Classification Search
CPC .... G06F 3/0659; G06F 3/0679; G06F 3/0638; G06F 7/24; G06F 3/0613; G06F 3/0658
USPC .................................................. 711/102, 103
See application file for complete search history.

(56) References Cited

U.S. PATENT DOCUMENTS

| 9,100,012 B1* | 8/2015 | Chen ....................... G06F 30/34 |
| 9,176,775 B2 | 11/2015 | Chamberlain et al. |
| 9,251,219 B2 | 2/2016 | Asaad et al. |
| 9,336,274 B2 | 5/2016 | Asaad et al. |
| 9,495,139 B2 | 11/2016 | Stitt et al. |
| 9,619,499 B2 | 4/2017 | Asaad et al. |
| 9,740,511 B2 | 8/2017 | Lyashevsky |

(Continued)

OTHER PUBLICATIONS

Chen, Ren et al., "Energy and Memory Efficient Mapping of Bitonic Sorting on FPGA," Proceedings of the 2015 ACM/SIGDA International Symposium on Field-Programmable Gate Arrays, ACM, 2015, 37 pages.

(Continued)

*Primary Examiner* — Hashem Farrokh
(74) *Attorney, Agent, or Firm* — Lewis Roca Rothgerber Christie LLP (57) ABSTRACT

A storage system includes: a storage device to store an array of data elements associated with a sort operation; a storage interface to facilitate communications between the storage device and a host computer; and a reconfigurable processing device communicably connected to the storage device, the reconfigurable processing device including: memory to store input data read from the storage device, the input data corresponding to the array of data elements stored in the storage device; and a kernel including one or more compute components to execute the sort operation on the input data stored in the memory according to a SORT command received from the host computer. The reconfigurable processing device is to dynamically instantiate the one or more compute components to accelerate the sort operation.

20 Claims, 7 Drawing Sheets

(56) References Cited

U.S. PATENT DOCUMENTS

| | | | | |
|---|---|---|---|---|
| 2005/0144168 A1* | 6/2005 | Kurokawa | ................ | G06F 7/24 |
| 2011/0314444 A1* | 12/2011 | Zhang | ....................... | G06F 8/45 |
| | | | | 717/106 |
| 2015/0046475 A1* | 2/2015 | Asaad | ...................... | G06F 7/24 |
| | | | | 707/752 |
| 2015/0149691 A1 | 5/2015 | Baxter | | |
| 2017/0168827 A1* | 6/2017 | Mishra | ................ | G06F 9/30029 |
| 2019/0235863 A1* | 8/2019 | Nousias | ............. | G06F 9/30072 |
| 2019/0278720 A1* | 9/2019 | Olarig | .................. | G06F 3/0655 |
| 2020/0372099 A1* | 11/2020 | Anderson | ............ | G06F 9/3001 |

OTHER PUBLICATIONS

Jun, Sang-Woo et al., "Terabyte Sort on FPGA-Accelerated Flash Storage," 2017 IEEE 25th Annual International Symposium on Field-Programmable Custom Computing Machines, IEEE, 2017, 8 pages.
Mueller, Rene et al., "Sorting Networks on FPGAs," The VLDB Journal—The International Journal on Very Large Data Bases, 2012, 25 pages.
Muslim, Fahad Bin et al., "Efficient FPGA Implementation of OpenCL High-Performance Computing Applications via High-Level Synthesis," IEEE Access, vol. 5, 2017, 16 pages.
Srivastava, Ajitesh et al., "A Hybrid Design for High Performance Large-scale Sorting on FPGA," 2015 International Conference on ReConFigurable Computing and FPGAs, IEEE, 2015, 6 pages.

* cited by examiner

SYSTEM AND METHOD FOR HIERARCHICAL SORT ACCELERATION NEAR STORAGE

CROSS-REFERENCE TO RELATED APPLICATION(S)

This application claims priority to and the benefit of U.S. Provisional Application No. 62/927,626, filed on Oct. 29, 2019, entitled "HIERARCHICAL FPGA-BASED SORT ACCELERATION NEAR STORAGE," the entire content of which is incorporated herein by reference.

FIELD

Aspects of one or more example embodiments of the present disclosure relate to a storage system, and more particularly, to systems and methods for hierarchical sort acceleration near storage.

BACKGROUND

Generally, sort operations are used to rearrange elements in an array or a list according to a comparison of the elements, and are computationally complex with nonlinear timing complexity. Sort operations are widely used in various applications from database applications to graphing algorithms. For example, database applications, such as GROUP BY, JOIN, and/or the like, generally use the sort operation as their building operation (or basic operation), and thus, the sort operation is often a key factor in the performance of the database applications.

However, different database applications may have various different operations and specifications, and thus, different operations and requirements may need to be supported when implementing the sort operation for different database applications. For example, to implement the sort operation for various different database applications, a fixed sorting engine may be designed according to the user requirements and resource requirements to adapt the fixed sorting engine to different database applications. In this case, however, substantial design-time overhead may be expended in order to design (or adapt) the fixed sorting engine according to various different requirements.

The above information disclosed in this Background section is for enhancement of understanding of the background of the present disclosure, and therefore, it may contain information that does not constitute prior art.

SUMMARY

One or more example embodiments of the present disclosure are directed to a storage system for hierarchical sort acceleration near storage, and a method including the same.

According to an example embodiment of the present disclosure, a storage system includes: a storage device configured to store an array of data elements associated with a sort operation; a storage interface configured to facilitate communications between the storage device and a host computer; and a reconfigurable processing device communicably connected to the storage device, the reconfigurable processing device including: memory configured to store input data read from the storage device, the input data corresponding to the array of data elements stored in the storage device; and a kernel including one or more compute components configured to execute the sort operation on the input data stored in the memory according to a SORT command received from the host computer. The reconfigurable processing device is configured to dynamically instantiate the one or more compute components to accelerate the sort operation.

In an example embodiment, the reconfigurable processing device may include a field programmable gate array (FPGA), and the storage device may include a solid state drive (SSD).

In an example embodiment, the input data may be read from the SSD by the host computer and loaded into primary memory of the host computer, and the memory of the FPGA may be configured to receive the input data from the primary memory of the host computer.

In an example embodiment, the storage system may further include a direct interconnect between the memory and the SSD, and the FPGA may be configured to directly access the SSD to read the input data from the SSD to the memory via the direct interconnect.

In an example embodiment, the FPGA and the SSD may be implemented on the same circuit board.

In an example embodiment, the FPGA may be configured to access the SSD via the direct interconnect using point-to-point (P2P) communications to bypass the host computer when reading data from the SSD.

In an example embodiment, the memory may include dynamic random-access memory (DRAM).

In an example embodiment, the one or more compute components may include a plurality of processing elements, and each of the plurality of processing elements may be configured to sort a segment of the array of data elements corresponding to the input data according to a sorting algorithm.

In an example embodiment, each of the processing elements may include a local comparator and a local merger, and the local comparator and the local merger may be configured to generate a partially sorted array from the segment using the sorting algorithm.

In an example embodiment, the one or more compute components may further include a processing unit connected to an output of each of the processing elements, and the processing unit may be configured to sort the outputs of the processing elements according to the sorting algorithm.

In an example embodiment, the processing unit may include a global comparator and a global merger, and the global comparator and the global merger may be configured to generate a fully sorted array of the input data from the partially sorted arrays output by the processing elements using the sorting algorithm.

In an example embodiment, the sorting algorithm may be a Bitonic sorting algorithm.

In an example embodiment, the reconfigurable processing device may be configured to dynamically instantiate a number of the processing elements and the processing unit at run-time according to a size of the array of data elements.

In an example embodiment, the reconfigurable processing device may be configured to: identify a size of the array of data elements; compare the size of the array of data elements with one or more threshold sizes; and instantiate the number of processing elements and the processing unit according to the comparison.

According to an example embodiment of the present disclosure, a method for dynamically scaling a sort operation for a storage system including a storage device to store an array of data elements associated with a sort operation, a storage interface to facilitate communications between the storage device and a host computer, and a reconfigurable processing device communicably connected to the storage device, is provided. The method includes: identifying, by the reconfigurable processing device, a size of the array of data elements associated with a sort command from the host computer; comparing, by the reconfigurable processing device, the size with one or more threshold sizes; and instantiating, by the reconfigurable processing device, one or more compute components according to the comparison to accelerate the sort operation.

In an example embodiment, the reconfigurable processing device may include a field programmable gate array (FPGA), and the storage device may include a solid state drive (SSD).

In an example embodiment, the instantiating of the one or more compute components may include reconfiguring one or more logic blocks and one or more interconnects of a kernel of the FPGA.

In an example embodiment, the instantiating of the one or more compute components may include instantiating, by the reconfigurable processing device, at least one local sort compute component, and the method may further include: sorting, by the at least one local sort compute component, at least a segment of the array of data elements; and generating, by the at least one local sort compute component, a sorted array of the at least the segment.

In an example embodiment, the instantiating of the one or more compute components may include instantiating, by the reconfigurable processing device, a plurality of local sort compute components, and the method may further include: sorting, by each of the local sort compute components, a different segment of the array of data elements; and generating, by each of the local sort compute components, a partially sorted array of the corresponding segment.

In an example embodiment, the instantiating of the one or more compute components may further include instantiating, by the reconfigurable processing device, a global sort compute component connected to outputs of each of the local sort compute components, and the method may further include: sorting, by the global sort compute component, the partially sorted array generated by each of local sort compute components; and generating, by the global sort compute component, a fully sorted array corresponding to the array of data elements from the sorting of the partially sorted arrays.

BRIEF DESCRIPTION OF THE DRAWINGS

The above and other aspects and features of the present disclosure will become more apparent to those skilled in the art from the following detailed description of the example embodiments with reference to the accompanying drawings, in which.

DETAILED DESCRIPTION

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

According to one or more example embodiments of the present disclosure, a hierarchical architecture for sort acceleration may be provided, in which design flexibility and scalability may be improved in terms of delivering a wide range of performance and area trade-offs with a reconfigurable design according to various requirements, resource availability, and/or the like. For example, in brief overview, a template-based hierarchical architecture may be provided in which one or more template-based compute components may be highly optimized. In some embodiments, the compute components may be dynamically instantiated according to various static and/or dynamic requirements (e.g., user requirements, resource requirements, data size, and/or the like) to increase the efficiency of the sort operations. For example, in some embodiments, the compute components may be increased and/or decreased (e.g., in real-time or near real-time) according to a size of the incoming data array. In this case, for example, fixed size limitations on the incoming data array that are imposed by fixed sorting engines may be reduced or eliminated.

In some embodiments, performance of the sorting operations may be improved or optimized by executing sorting steps in a reconfigurable processing device rather than a host computer. For example, rather than utilizing resources (e.g., CPU utilization) of the host computer to perform the sort operation, the sort operation may be executed by the reconfigurable processing device such that the resources of the host computer may be utilized for other operations and functions. Accordingly, energy consumption may be reduced by reducing resource utilization (e.g., CPU utilization) of the host computer. Further, in some embodiments, the reconfigurable processing device may be configured for data-level parallelism, and a suitable parallel sorting algorithm (e.g., Bitonic Sort) may be used to perform a plurality of sorting steps in parallel (e.g., concurrently) by the reconfigurable processing device. Accordingly, execution time of the sort operation may be reduced, and energy consumption by the sort operation may be reduced.

In some embodiments, scalability of the sorting operation may be improved by reducing or eliminating bottlenecks (e.g., CPU utilization, PCI bandwidth, and/or the like) imposed by the host computer. For example, in some embodiments, a direct interconnect may be provided between the reconfigurable processing device and a storage device, such that direct data transfers between the reconfigurable processing device and the storage device may be enabled without involving the host computer in the data transfers. In this case, for example, rather than having the host computer transfer the incoming data array from the storage device to the reconfigurable processing device for sorting, the reconfigurable processing device may directly access the incoming data array from the storage device via the direct interconnect. Accordingly, the bottlenecks (e.g., CPU utilization, PCI bandwidth, and/or the like) imposed by the host computer may be reduced or eliminated, and energy consumption by the host computer may be reduced by reducing, for example, the CPU utilization, execution time, and/or the like.

Figure 1:
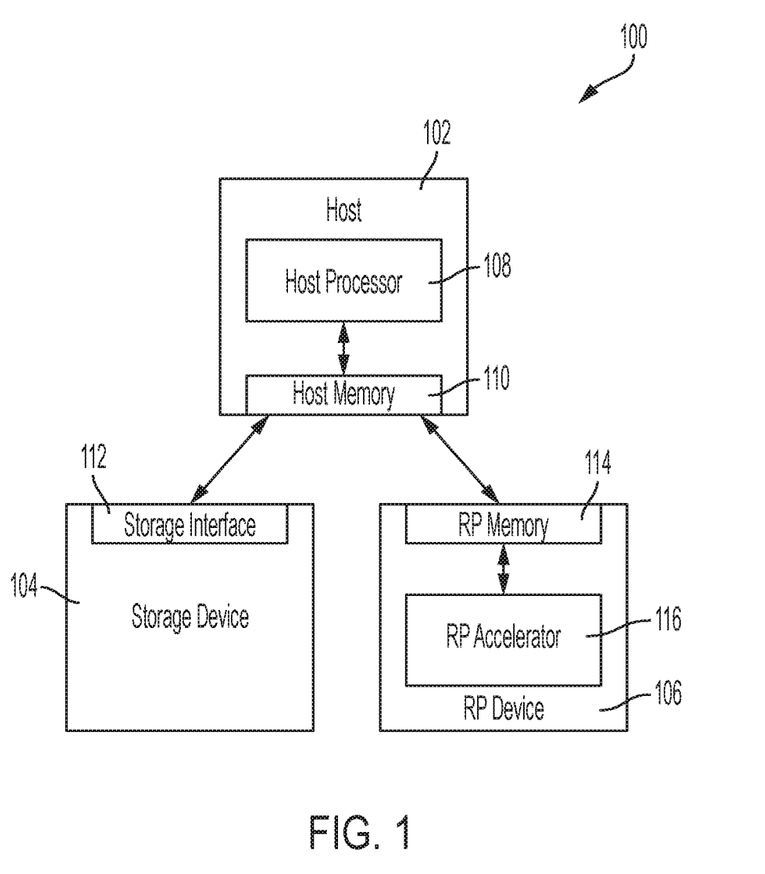
FIG. 1 is a system diagram of a storage system, according to one or more example embodiments of the present disclosure.

FIG. 1 is a system diagram of a storage system, according to one or more example embodiments of the present disclosure.

Referring to FIG. 1, the storage system 100 may include a host computer 102, a storage device 104, and a reconfigurable processing (RP) device (e.g., a reconfigurable processing circuit or an embedded processing device) 106. The host computer 102 is communicably connected to the storage device 104 and the RP device 106, and provides commands thereto to process data elements stored on the storage device 104 according to the commands. For example, the host computer 102 may provide a SORT command such that the RP device 106 sorts an array of the data elements stored in the storage device 104.

The host 102 may include a host processor 108 and host memory 110. The host processor 108 may be a general purpose processor, for example, such as a central processing unit (CPU), of the host computer 102. The host memory 110 may be considered as high performing main memory (e.g., primary memory) of the host computer 102. For example, in some embodiments, the host memory 110 may include (or may be) volatile memory, for example, such as dynamic random-access memory (DRAM). However, the present disclosure is not limited thereto, and the host memory 110 may include (or may be) any suitable high performing main memory (e.g., primary memory) replacement for the host computer 102 as would be known to those skilled in the art. For example, in other embodiments, the host memory 110 may be relatively high performing non-volatile memory that may provide fast access and low input/output (IO) latencies, such as Z-NAND™ (available from Samsung), 3D X-POINT™ (available from Intel and Micron Technology), Phase Change Memory, Resistive RAM, STTRAM, and/or the like.

The storage device 104 may be considered as secondary memory that may persistently store the data elements to be accessed by the host computer 102, and/or to be processed by the RP device 106 according to the commands (e.g., SORT). In this context, the storage device 104 may include (or may be) relatively slower memory when compared to the high performing memory of the host memory 110. For example, in some embodiments, the storage device 104 may include non-volatile memory, such as NAND flash memory, to persistently store the data elements, and may include (or may be) a solid-state drive (SSD), for example. However, the present disclosure is not limited thereto, and in other embodiments, the storage device 104 may include (or may be) any suitable storage device including any suitable memory as would be known to those skilled in the art, to persistently store the array of data elements to be processed (e.g., sorted) by the RP device 106 according to a command (e.g., a SORT command) from the host computer 102. In still other embodiments, the storage device 104 may include any suitable device that may transfer data to the reconfigurable processing device 106 for sorting. For example, in some embodiments, the storage device 104 may include a network card, Ethernet SSD, wave card, and/or the like. In various embodiments, the storage device 104 may conform to a large form factor standard (e.g., a 3.5 inch hard drive form-factor), a small form factor standard (e.g., a 2.5 inch hard drive form-factor), an M.2 form factor, and/or the like. In other embodiments, the storage device 104 may conform to any suitable or desired derivative of these form factors.

In some embodiments, the storage device 104 may include a storage interface 112 to facilitate communications (e.g., using a connector and a protocol) between the host computer 102 and the storage device 104. In some embodiments, the storage interface 112 may facilitate the exchange of storage requests and responses between the host computer 102 and the storage device 104. In some embodiments, the storage interface 112 may facilitate data transfers by the storage device 104 to and from the host memory 110 of the host computer 102. For example, in some embodiments, the storage interface 112 (e.g., the connector and the protocol thereof) may include (or may conform to) Peripheral Component Interconnect Express (PCIe), remote direct memory access (RDMA) over Ethernet, Serial Advanced Technology Attachment (SATA), Fibre Channel, Serial Attached SCSI (SAS), Non Volatile Memory Express (NVMe), and/or the like. In other embodiments, the storage interface 112 (e.g., the connector and the protocol thereof) may include (or may conform to) various general-purpose interfaces, for example, such as Ethernet, Universal Serial Bus (USB), and/or the like.

The RP device 106 may process the data elements stored on the storage device 104 according to the commands from the host computer 102. For example, in some embodiments, the RP device 106 may sort the array of data elements stored on the storage device 104 according to a SORT command from the host computer 102.

Because the RP device 106 executes the SORT command instead of the host computer 102, resource usage (e.g., CPU usage and/or the like) of the host computer 102 may be reduced. Accordingly, the RP device may be communicably connected with the storage device 104 to access the data elements stored on the storage device 104. For example, in various embodiments, the RP device 106 may be communicably connected to the storage device 104 via the host computer 102 and/or via a direct (or private) interconnect, which will be described in more detail below with reference to FIG. 6. In this context, the RP device 106 may be considered as a storage processor (or a supplemental processor) for the storage device 104 that is separate and distinct from the host processor 108. In various embodiments, the RP device 106 may be implemented as an integrated circuit (IC), and may be embedded on the same board (e.g., the same circuit board) as that of the storage device 104, or may be implemented on a separate board (e.g., a separate circuit board) from that of the storage device 104.

In some embodiments, the RP device 106 may be configured for parallel processing of the data elements, such that various processing steps may be executed in parallel (e.g., concurrently). For example, in some embodiments, the RP device 106 may include (or may be) a Field Programmable Gate Array (FPGA) configured with a suitable sort algorithm to sort rows and/or columns of the array of data elements in parallel (e.g., concurrently), but the present disclosure is not limited thereto. For example, in other embodiments, the RP device 106 may include (or may be) a reconfigurable Application Specific Integrated Circuit (ASIC) (e.g., a dynamically programmable ASIC) configured with a suitable sort algorithm to sort the data elements in parallel (e.g., concurrently), or to sort the data elements in a sequential process.

In more detail, in some embodiments, the RP device 106 may include RP memory 114, and an RP accelerator 116. In some embodiments, the RP memory 114 may be considered as internal memory of the RP device 106 that is different (e.g., that is distinct) from the host memory 110 and from the memory of the storage device 104. In some embodiments, the RP memory 114 may be used by the RP device 106 for caching (e.g., storing or temporarily storing) the data elements retrieved from the storage device 104 (e.g., the data elements retrieved via the host computer 102 or via a direct interconnect), and to sort the data elements cached in the RP memory 114 according to the SORT command from the host computer 102. In this context, the RP memory 114 may be considered as lower capacity memory when compared to that of the host memory 110 and the memory of the storage device 104. In various embodiments, the RP memory 114 may include (or may be) volatile memory, for example, such as DRAM, but the present disclosure is not limited thereto, and in other embodiments, the RP memory 114 may include (or may be) any suitable volatile memory or non-volatile memory as would be known to those skilled in the art. For example, in various embodiments, the RP memory 114 may include (or may be) Z-NAND™, 3D X-POINT™, Tightly-Coupled Memory (TCM), Phase Change Memory, Resistive RAM, STTRAM, and/or the like.

In some embodiments, the RP accelerator 116 may be configured to facilitate (e.g., accelerate) the operations associated with the command (e.g., the SORT command). For example, the RP accelerator 116 may include a plurality of compute components configured to implement any suitable sorting algorithm to sort the data elements (e.g., the array of data elements). For example, the compute components may include one or more processing elements (PE) and/or one or more processing units (PU), which will be discussed in more detail below. In some embodiments, the compute components (e.g., the PU and the PE) may be composable, and may be dynamically configurable according to user requirements, type of application (e.g., database application, graphing application, and/or the like), size of the array of data elements, resource constraints (e.g., memory, number of channels, and/or the like) of the RP device 106, number of other operations being computed or waiting to be computed (e.g., concurrently processed or sequentially processed) by the RP device 106, and/or the like, which will be discussed in more detail below.

Figure 2:
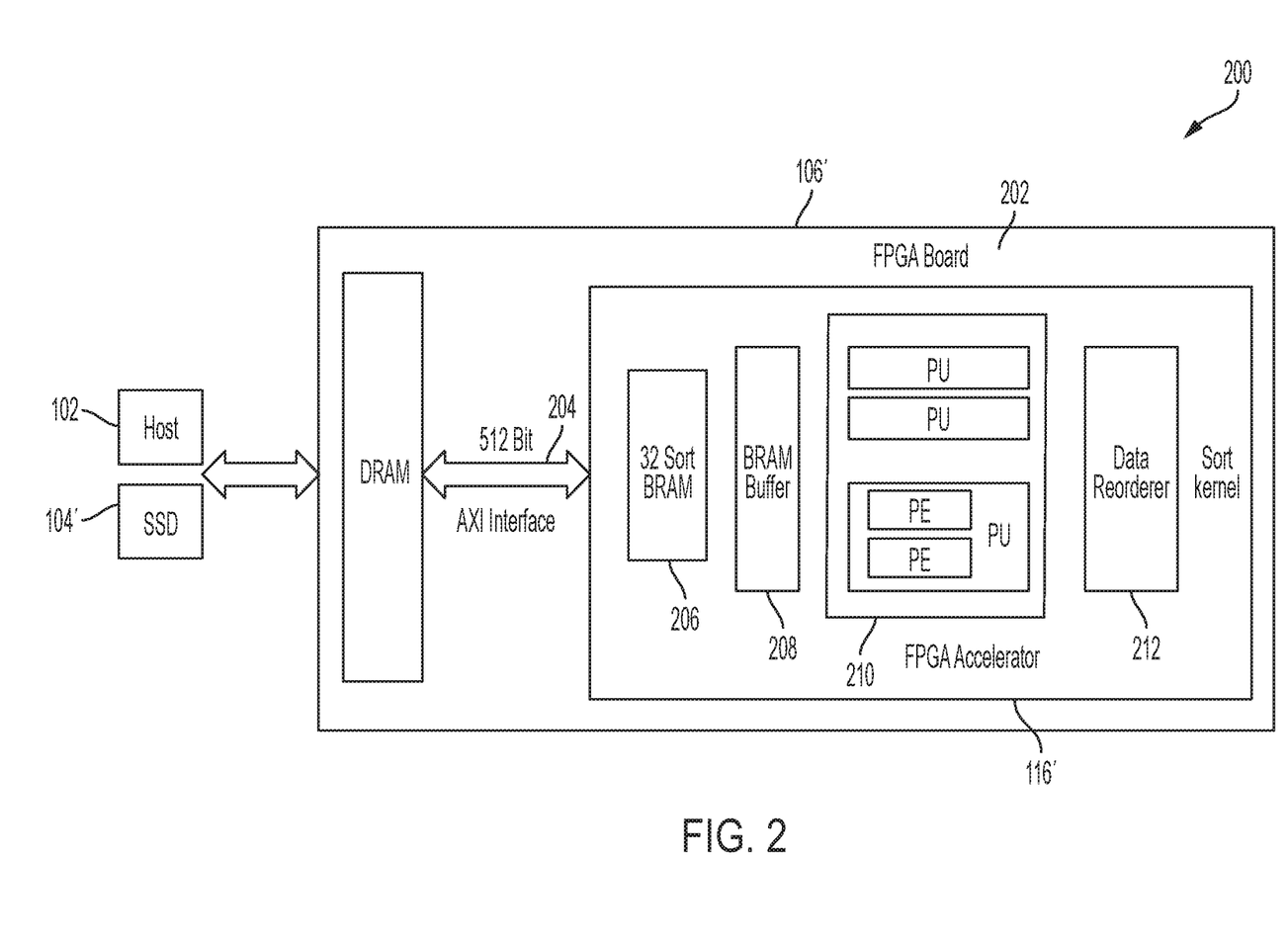
FIG. 2 is a block diagram of a storage system, according to one or more example embodiments of the present disclosure.

FIG. 2 is a block diagram of a storage system, according to one or more example embodiments of the present disclosure. The storage system 200 shown in FIG. 2 may be the same or substantially the same as (or similar to) the storage system 100 shown in FIG. 1, and thus, redundant description thereof may be simplified or may not be repeated. Hereinafter, for convenience, an SSD 104' may be described as a representative example of the storage device 104, a DRAM 114' may be described as a representative example of the RP memory 114, and an FPGA 106' may be described as a representative example of the RP device 106. However, as discussed above, the present disclosure is not limited to these representative examples, and each of the storage device 104, the RP memory 114, and the RP device 106 may include (or may be) any suitable ones of the examples discussed above in relation thereto, and/or may include other suitable examples known to those skilled in the art.

Referring to FIG. 2, in some embodiments, the storage system 200 may include the host computer 102, the SSD 104', and the FPGA 106'. The host computer 102 is communicably connected to the SSD 104' and the FPGA 106', and provides commands thereto to process data elements stored on the SSD 104'. For example, the host computer 102 may provide a SORT command, such that the FPGA 106' sorts an array of data elements stored in the SSD 104' according to a suitable sort algorithm. In some embodiments, the FPGA 106' may include an FPGA board (e.g., an FPGA circuit board) 202 including the DRAM 114', an FPGA accelerator 116', and an interface 204 to facilitate communications between the DRAM 114' and the FPGA accelerator 116'. For example, in some embodiments, the DRAM 114' may be implemented as a plurality of memory cells on the FPGA board 202 and the FPGA accelerator 116' may be implemented on a kernel (e.g., a sort kernel) on the FPGA board 202.

As used herein, a "memory cell" refers to the smallest unit in memory capable of storing data. For example, a DRAM memory cell may store one bit of data, and may include a capacitor for storing an electric charge, and a transistor for selectively charging the capacitor with the one bit of data.

In some embodiments, the DRAM 114' may cache input data (e.g., the data elements to be sorted of the SSD 104'), and the interface 204 may be used to read the input data from the DRAM 114' to a Block Random Access Memory (BRAM) 206 of the FPGA accelerator 116'. For example, the interface 204 may include (or may be) a 512-bit Advanced Extensible Interface (AXI inteface), but the present disclosure is not limited thereto, and the interface 204 may include (or may be) any suitable interface using any suitable protocol to read the input data from the DRAM 114' to the BRAM 206, as would be known to those skilled in the art.

The FPGA accelerator 116' may include the BRAM 206, a BRAM buffer 208, a plurality of compute components 210, and a data reorderer 212. The FPGA accelerator 116' may sort the input data in the BRAM 206 using any suitable sorting algorithm, and may store the sorted input data into the BRAM buffer 208. In some embodiments, the sorting algorithm used by the FPGA accelerator 116' may be determined (e.g., may be predetermined) according to a type of the device of the RP device 106, and/or the processing capabilities and functionalities of the RP device 106, such that the sorting operation may be enhanced (e.g., accelerated, improved, and/or optimized).

For example, in some embodiments, when the RP device 106 is the FPGA 106', the sorting algorithm used may be a parallel sorting algorithm that utilizes the parallel processing capabilities of the FPGA 106', for example, such as Bitonic Sort. According to an example embodiment, Bitonic Sort may improve or optimize performance in parallel processing implementations when compared to other sorting algorithms. In each step (e.g., every step) of Bitonic sort the number of operations may remain the same, and the main operation in Bitonic sort is compare and swap. For example, two numbers are compared, and based on a sort direction, the two numbers may be swapped. Further, in Bitonic sort, all sorting steps may be executed in parallel (e.g., concurrently) with each other. Therefore, in all the steps of Bitonic sort, all the allocated resources may be used. Thus, while Bitonic Sort may have higher timing complexities when compared to those of other sorting algorithms (e.g., Quick Sort, Merge Sort, and the like), Bitonic Sort may be desired for processors with parallel computation capabilities, for example, such as FPGAs, Graphical Processing Units (GPUs), and/or the like. Likewise, because the FPGA 106' may be configured for data level parallelism, the FPGA 106' may further improve or optimize the acceleration of Bitonic Sort when compared to other sorting algorithms. However, the present disclosure is not limited thereto, and any suitable parallel or sequential sorting algorithm may be used to sort the input data, for example, such as Quick Sort, Merge Sort, Insertion Sort, Selection Sort, or the like, or a combination thereof.

Figure 3:
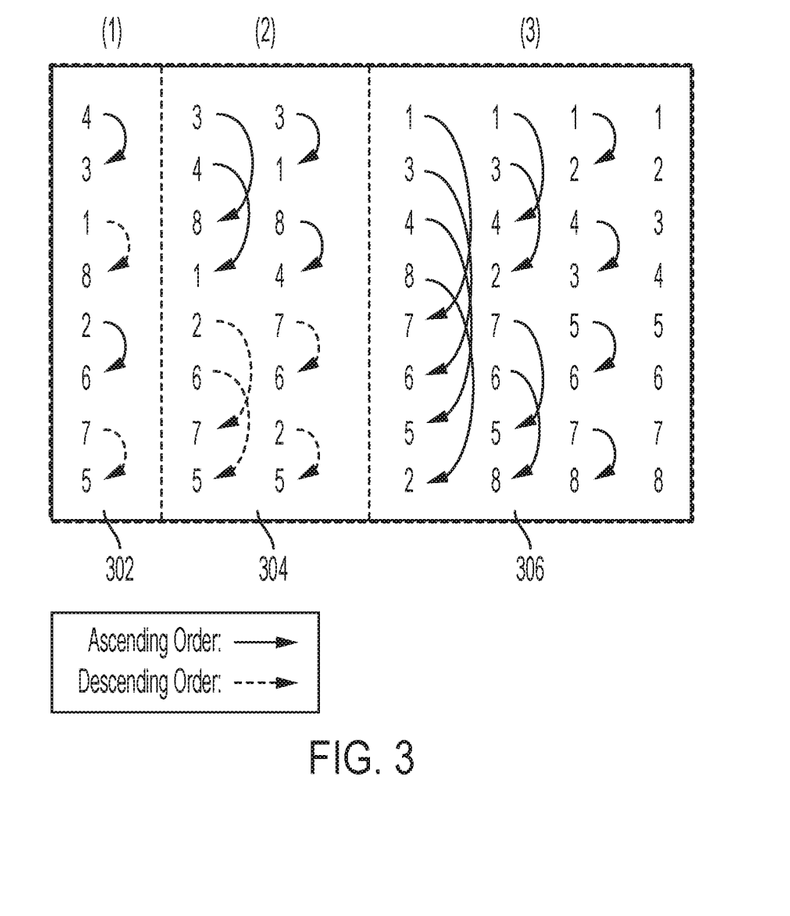
FIG. 3 is an illustrative example of a sort operation, according to one or more example embodiments of the present disclosure.

Referring briefly to FIG. 3, FIG. 3 is an illustrative example of a sort operation according to one or more example embodiments of the present disclosure. As an illustrative example, FIG. 3 shows an example of a Bitonic sort for 8 random inputs. Bitonic sort is a parallel sorting algorithm that uses Bitonic sequences to generate a sorted array. For example, Bitonic sort transforms a Bitonic sequence into a monotonically sorted sequence. A Bitonic sequence may be regarded as a partially sorted array that includes two sorted segments, one ascending and the other descending. For example, two sorted arrays with size N may be combined and merged to create a sorted array with size 2N (where N is an integer). The second array is reversed and concatenated to the first array to create a Bitonic sequence. For example the Bitonic sequence, 1, 2, 2, 4, 5, 6, 8, 5, 4, 3, 2, 1, may be regarded as a partially sorted list that includes two sorted monotonic subsequences, one ascending and the other descending. The Bitonic sequence may be merged (e.g., using Bitonic merge) to transform the Bitonic sequence into a sorted array.

As shown in FIG. 3, for 8 random inputs, Bitonic sort may include 3 steps 302, 304, and 306, and each step may include 4 comparisons indicated by the arrows. The solid arrows show the comparisons for ascending order, and the dashed arrows show the comparisons for descending order. For each comparison, two numbers are compared and may be swapped according to the sort direction. In Bitonic sort, elements may be compared in in a predefined sequence, and the sequence of comparison does not depend on the input data. Accordingly, in each of the steps (e.g., in all the steps) 302, 304, and 306 of Bitonic sort, all of the allocated resources may be used, and each of the steps may be executed in parallel (e.g., concurrently). Hereinafter, for convenience, Bitonic sort may be described as a representative example of the sorting algorithm used by the FPGA accelerator 116' to accelerate the SORT operation. However, as discussed above, the present disclosure is not limited to the representative example of using Bitonic sort as the sorting algorithm, and the sorting algorithm used by the FPGA accelerator 116' may include (or may be) any suitable one of the other example sorting algorithms discussed above, and/or may include other suitable examples of sorting algorithms as known to those skilled in the art.

Referring back to FIG. 2, the plurality of compute components 210 may be configured to sort the input data (e.g., the data elements) stored on the BRAM 206 using the Bitonic sort algorithm (or any other suitable sorting algorithm). In some embodiments, the plurality of compute components 210 may include one or more processing elements PE and/or one or more processing units PU. For example, in some embodiments, the plurality of compute components 210 may include one or more processing units PU, and each processing unit PU may include a plurality of processing elements PE depending on the requirements (e.g., user requirements, application requirements, data size requirements, and/or the like). In another example, the compute components 210 may include one processing unit PU, and the one processing unit PU may include any suitable or desired number of processing elements PE depending on the requirements. In still another example, the compute components 210 may include a single processing element PE depending on the requirements, and in this case, may not include any processing units PU.

In other words, the processing elements PE may be considered as lower order sorting compute components (e.g., as local sort compute components) that may sort the data elements (e.g., integer elements) read from the BRAM 206, and the processing units may be considered as higher order sorting compute components (e.g., as global sort compute components) that may sort the outputs of the processing elements PE. For example, the processing unit PU may include a plurality of processing elements PE, and the processing unit PU may sort the outputs of the plurality of processing elements PE. Further, when there are a plurality of processing units PU, the data reorderer 212 may order (e.g., sort and/or merge) the outputs of the plurality of processing units PU. However, the present disclosure is not limited thereto, and the data reorderer 212 may be omitted. For example, when the FPGA 106' includes only one processing element PE or only one processing unit PU including a plurality of processing elements PE, the data reorderer 212 may be omitted.

In some embodiments, each of the processing units PU and the processing elements PE may be dynamically composable and/or configurable. For example, in some embodiments, the FPGA 106' may dynamically instantiate any desired or suitable number of the processing elements PE and/or the processing units PU as needed or desired, for example, in order to increase or improve the efficiency of the sorting operations. For example, different database applications may have various operations and specifications, and thus, different operations and kernels may be implemented on the FPGA 106' in order to accelerate different database applications on the FPGA 106'. In this case, the available resources of the FPGA 106' may be distributed among the kernels (e.g., the sort kernel 116'), and thus, the amount of available resources for each kernel may vary for different applications.

Accordingly, in some embodiments, the FPGA 106' may increase or decrease the number of processing units PU and/or processing elements PE according to various user requirements, application requirements, requirements for supporting other operations (e.g., READ, WRITE, and/or the like), data size requirements, resource requirements, and/or the like. For example, the FPGA 106' includes an array of programmable logic blocks, and a plurality of reconfigurable interconnects that connect the logic blocks in various different configurations. The logic blocks and the interconnects may be programmed (e.g., reprogrammed or reconfigured) using a suitable Hardware Description Language (HDL). In this case, the FPGA 106' may instantiate any suitable or desired number of processing units PU and/or processing elements PE by dynamically reprogramming or reconfiguring the logic blocks and/or the interconnects at runtime (e.g., in real-time or near real-time) and/or at setup time according to various static and/or changing requirements. In some embodiments, when a parallel processing sort algorithm is used, the FPGA 106' may increase or decrease the parallelization of the sort operation by increasing or decreasing the number of processing elements PE and/or processing units PU that perform the sort steps in parallel. An example structure and/or a configuration implementation of the processing units PU and the processing elements PE will be discussed in more detail with reference to FIGS. 4 and 5.

Figure 4:
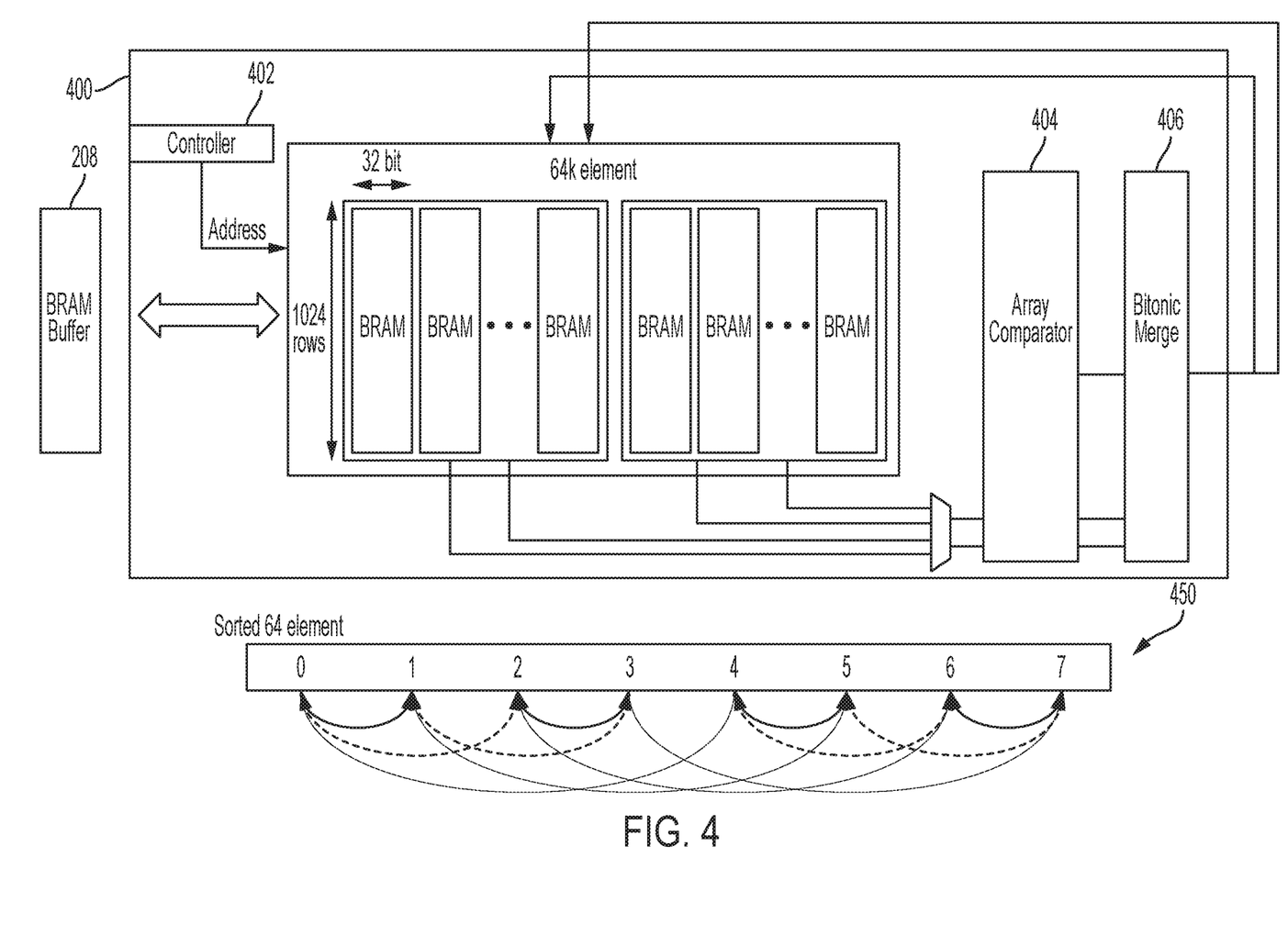
FIG. 4 is a block diagram of a processing element of a storage system, according to one or more example embodiments of the present disclosure.

FIG. 4 is a block diagram of a processing element (e.g., a local sort compute component) of a storage system, according to one or more example embodiments of the present disclosure. The processing element PE 400 shown in FIG. 4 may be the same or substantially the same as (or similar to) the processing element PE described above with reference to FIG. 3, and thus, redundant description thereof may be simplified or may not be repeated.

Referring to FIG. 4, the processing element PE 400 may include a controller 402, a local comparator (e.g., an array comparator) 404, and a local merger (e.g., a Bitonic merger) 406. The controller 402 may read input data from the BRAM buffer 208 to be sorted by the processing element PE 400 using a suitable sorting algorithm, for example, such as Bitonic sort as shown in 450 of FIG. 4. For example, the local comparator 404 may compare the input data read from the BRAM buffer 208, and the local merger 406 may merge the input data according to the sorting algorithm to generate a sorted array of the input data. The sorted array may be stored in the BRAM buffer 208.

As a representative example, the processing element PE 400 may locally sort 64K integer elements by performing a local sort operation by sorting (e.g., using the local comparator 404 and the local merger 406) 1024 rows, where each row has 64 elements, for example, as shown in 450 of FIG. 4. For example, 1024 individually sorted rows may become a 64K element (where K=1024) sorted array after performing the merge (e.g., a Bitonic merge) using the local merger 406. However, the present disclosure is not limited to the representative example shown in FIG. 4, and the processing element PE may sort any suitable or desired number of integer elements according to the resources (e.g., a size and/or a capacity of the DRAM 114' and/or the BRAM 206 (e.g., see FIG. 2)) of the FPGA 106' that is allocated for the processing element PE 400.

In some embodiments, the input data sorted by the processing elements PE may be a segment (e.g., a portion or a sub-set) of the data elements associated with the SORT command from the host computer 102 (e.g., see FIG. 1). For example, in some embodiments, the size of the array of data elements associated with the SORT request may exceed the amount of data that may be efficiently sorted using a single processing element PE. In this case, the FPGA 106' may instantiate one or more additional processing elements PE, and each of the processing elements PE may sort a different segment (e.g., a different portion or a different sub-set) of the data elements associated with the SORT command to generate a partially sorted array of the data elements. In some embodiments, the processing elements PE may generate their corresponding partially sorted array in parallel (e.g., concurrently) with each other. For example, in the case that the sorting algorithm used by the processing elements PE is Bitonic Sort, each of the processing elements PE may perform comparisons on the input data in parallel (e.g., concurrently) with each other. In some embodiments, the plurality of processing elements PE may sort segments of a portion of the data elements in parallel with each other, and may subsequently sort additional segments of a different portion of the data elements in parallel with each other (e.g., when input data is too large to all be sorted at once). In some embodiments, as discussed in more detail with reference to FIG. 5, the FPGA 106' may further instantiate one or more processing units PU to sort the outputs of the plurality of processing elements PE to generate a fully sorted array of the data elements.

Figure 5:
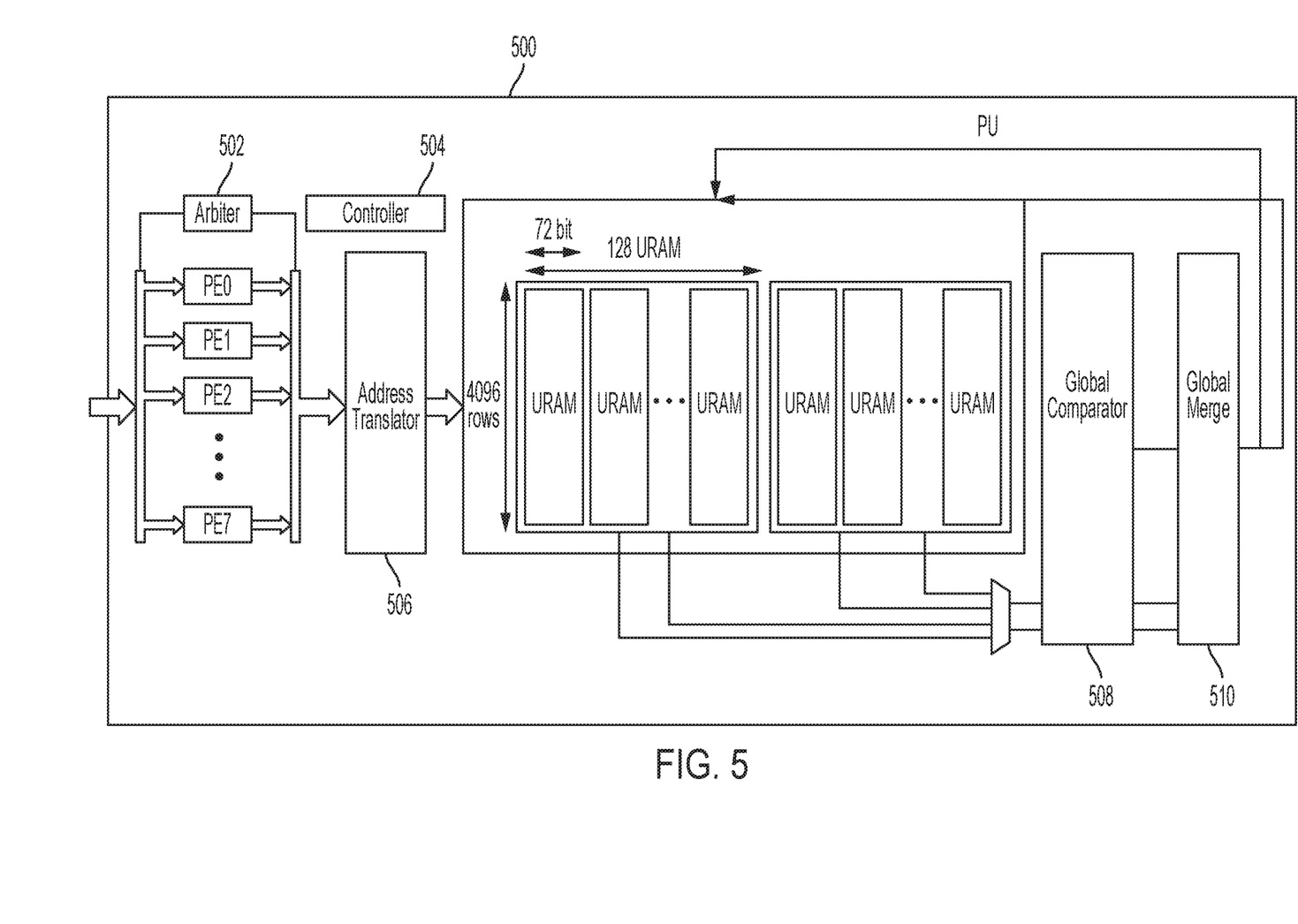
FIG. 5 is a block diagram of a processing unit of a storage system, according to one or more example embodiments of the present disclosure.

FIG. 5 is a block diagram of a processing unit (e.g., a global sort compute component) of a storage system, according to one or more example embodiments of the present disclosure. The processing unit PU 500 shown in FIG. 5 may be the same or substantially the same as (or similar to) the processing unit PU described above with reference to FIG. 3, and thus, redundant description thereof may be simplified or may not be repeated.

Referring to FIG. 5, the processing unit PU 500 may include a plurality of processing elements PE0 to PE7, an arbiter 502, a controller 504, an address translator 506, a global comparator 508, and a global merger 510. Each of the processing elements PE0 to PE7 may have the same or substantially the same configuration as that of the processing element PE 400 discussed above with reference to FIG. 4, and thus, redundant description thereof may be simplified or may not be repeated.

As discussed above, in some embodiments, each of the plurality of processing elements PE0 to PE7 may generate a partially sorted array of a segment (e.g., a portion or a sub-set) of the data elements associated with the SORT command, and the processing unit PU 500 may sort (e.g., globally sort) the outputs of the plurality of processing elements PE0 to PE7 to generate the fully sorted array of the data elements. While FIG. 5 shows eight processing elements PE0 to PE7, the present disclosure is not limited thereto, and the processing unit PU 500 may include any suitable number of processing elements PE according to the requirements (e.g., user requirements, application requirements, data size requirements, resource requirements, and/or the like).

In more detail, the controller 504 may provide control signals to operate the sort (e.g., the Bitonic sort). The arbiter 502 may handle multiple iterations of partial sort (e.g., the partial sort output by each of the processing elements PE0 to PE7). For example, the arbiter 502 may provide access to the outputs of each of the processing elements PE0 to PE7 that is stored on the BRAM buffer 208 (e.g., see FIG. 4) to the address translator 506, such that the outputs of the processing elements PE0 to PE7 may be further sorted by the processing unit PU 500. For example, the address translator 506 may map the outputs of the processing elements PE0 to PE7 to a buffer of the processing unit PU 500 to be further sorted by the processing unit PU 500 (e.g., by the global comparator 508 and the global merger 510). For example, the processing unit PU 500 may include a Unified Random Access Memory (URAM) buffer that stores the outputs of the processing elements PE0 to PE7 for sorting by the processing unit PU 500, and that stores the sort results output from the global comparator 508 and the global merger 510. After all the segments are sorted (e.g., by each of the processing elements PE0 to PE7), the resulting partial arrays are globally sorted by the global comparator 508 (e.g., according to the Bitonic sort algorithm) and the sorted segments are merged using the global merger 510 (e.g., according to the Bitonic merge algorithm) to globally sort the array. If the input data array includes further segments to be sorted, the further segments may be partially sorted by the processing elements PE, and the partially sorted arrays by the processing elements may be further sorted by the processing unit PU. Accordingly, by dynamically instantiating any suitable combinations of processing elements PE and processing units PU to perform the sort operation, a dynamically scalable hierarchical architecture for accelerating (e.g., improving and/or optimizing) sort operations may be provided.

Figure 6:
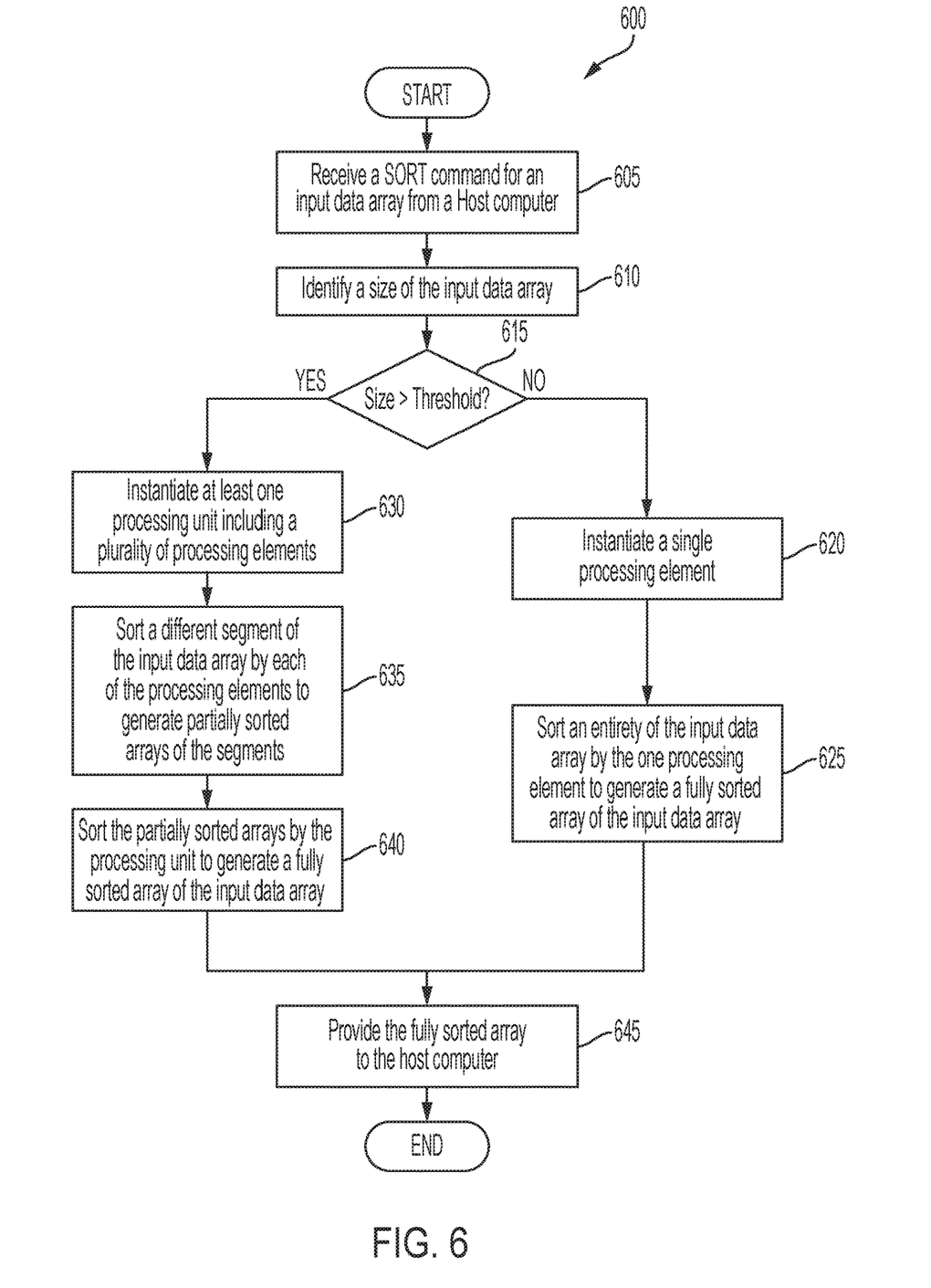
FIG. 6 is a flow diagram illustrating a method of dynamically scaling a sorting operation, according to one or more example embodiments of the present disclosure.

FIG. 6 is a flow diagram illustrating a method of dynamically scaling a sorting operation, according to one or more example embodiments of the present disclosure. However, the present disclosure is not limited to the sequence or number of the operations of the method 600 shown in FIG. 6, and can be altered into any desired sequence or number of operations as recognized by a person having ordinary skill in the art. For example, in some embodiments, the order may vary, or the method may include fewer or additional operations.

Referring to FIG. 6, the method 600 may start, and a SORT command may be received from a host computer at operation 605. For example, the SORT command may refer to a command by the host computer 102 to sort an input data array stored in the SSD 104. A size of the input data array may be identified at operation 610. For example, in some embodiments, the FPGA 106' may analyze the SORT command to identify the size of the input data array. In some embodiments, the size of the input data array may be compared with a threshold size (e.g., a reference size) at operation 615. For example, in some embodiments, the FPGA 106' may compare the size of the input data array with one or more threshold sizes (e.g., one or more reference sizes) in order to determine a suitable configuration of the compute components 210 (e.g., see FIGS. 2, 4, and 5) to be instantiated according to the size of the input data array. In other words, the one or more threshold sizes may correspond to different configurations of the processing elements PE and/or the processing units PU that may be used to efficiently sort the input data array according to a size of the input data array and/or various requirements (e.g., user requirements, application type, resource allocation requirements, requirements for supporting other operations, and/or the like).

For example, in some embodiments, the one or more threshold sizes may be stored in a look-up table (LUT) and/or the like, and each of the one or more threshold sizes may correlate with a suitable or desired combination (e.g., a predetermined combination) of processing elements PE and/or processing units PU that may be instantiated to efficiently sort the input data array according to the size of the input data array. For example, a size of the input data array that is less than a first threshold value may indicate that a single processing element PE may be sufficient to efficiently sort the input data array. In another example, a size of the input data array that is greater than or equal to the first threshold value and less than a second threshold value may indicate that a plurality of processing elements PE connected to a single processing unit PU may be sufficient to efficiently sort the input data array. In still another example, a size of the input data array that is greater than or equal to the second threshold value may indicate that a plurality of processing units PU, each including a plurality of processing elements PE, may be sufficient to efficiently sort the input data array. However, the present disclosure is not limited to these examples, and it should be appreciated that the threshold sizes may be divided according to various granular combinations of the processing elements PE and/or the processing units PU and according to various user requirements, resource allocation requirements, application type, other operations to be supported, and/or the like.

Referring back to FIG. 6, in some embodiments, when the size of the input data array is less than the threshold size at operation 615 (e.g., NO), it may be determined that a single processing element PE may be sufficient to efficiently sort the input data array as discussed above. Accordingly, the single processing element PE may be instantiated at operation 620, and the single processing element PE may sort an entirety of the input data array (e.g., in a parallel process or in a sequential process) to generate a fully sorted array of the input data array at operation 625. The fully sorted array may be returned to the host computer at operation 645, and the method may end.

On the other hand, when the size of the input data array is greater than the threshold size at operation 615 (e.g., YES), it may be determined that at least one processing unit including a plurality of processing elements PE may be sufficient to efficiently sort the input data array as discussed above. For example, in this case, the operation 615 may include one or more comparisons of the size of the input data array with one or more threshold values to determine a suitable number of processing units and processing elements to be instantiated such that the input data array may be efficiently sorted. Accordingly, at least one processing unit PU including a plurality of processing elements PE may be instantiated at operation 620, and the plurality of processing elements may sort a different segment (e.g., a different portion or a different sub-set) of the input data array to generate partially sorted arrays of the input data array at operation 625. For example, the input data array may be segmented among the plurality of processing elements PE, and each processing elements PE may generate a partially sorted array corresponding to its segment of the input data.

The partially sorted arrays may be sorted by the processing unit PE to generate a fully sorted array of the input data array at operation 640. For example, the partially sorted arrays output by the processing elements PE may be further sorted (e.g., globally sorted) by the processing unit PE to generate the fully sorted array of the input data array. The fully sorted array may be provided to the host computer at operation 645, and the method may end.

Figure 7:
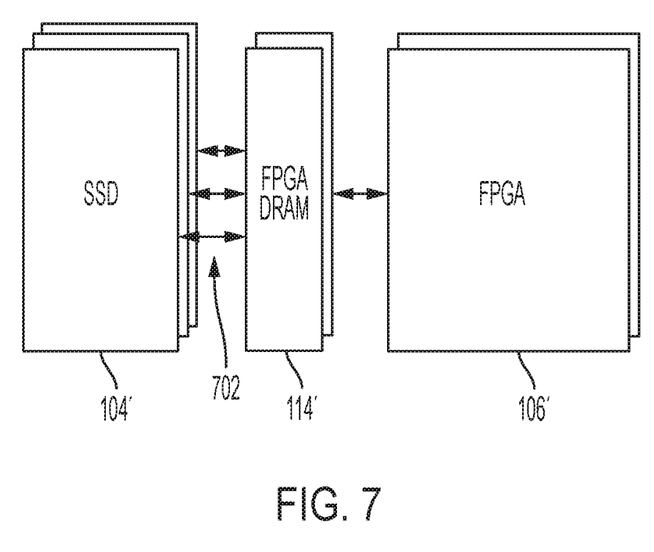
FIG. 7 is a system diagram of a storage system, according to one or more example embodiments of the present disclosure.

FIG. 7 is a system diagram of a storage system, according to one or more example embodiments of the present disclosure. The storage system 700 shown in FIG. 7 may be the same or substantially the same as (or similar to) the storage system 100 shown in FIG. 1, and thus, redundant description thereof may be simplified or may not be repeated. However, unlike the storage system 100 shown in FIG. 1, the storage system 700 shown in FIG. 6 may further include a direct (or a private) interconnect 702 between the RP device 106 (e.g., the FPGA 106') and the storage device 104 (e.g., the SSD 104'). For example, in some embodiments, the direct interconnect 702 may be used by the FPGA 106' to directly access the input data array stored in the SSD 104', and to read the input data array to the FPGA DRAM 114' without involving the host computer 102. Accordingly, latency and throughput limitations imposed by the host computer 102 may be reduced.

In more detail, referring to the embodiment of FIG. 1, the host computer 102 reads the input data array from the storage device 104 (e.g., the SSD 104'), and loads the input data array into the host memory 110. The host computer 102 then transmits the input data array from the host memory 110 to the RP memory 114 (e.g., the FPGA DRAM 114') to initiate the sort. In this case, communication costs between the host computer 102, the storage device 104 (e.g., the SSD 104'), and the RP device 106 (e.g., the FPGA 106') may be increased, and latency and throughput limitations may be increased. Moreover, general purpose processors, such as the host computer 102, may have limitations in scalability when communicating with multiple SSDs due to large CPU overhead and sharing of PCI bandwidth across multiple SSDs.

In comparison, referring to the embodiment shown in FIG. 7, the FPGA 106' may access one or more SSDs (e.g., the SSD 104') directly via the direct interconnect 702 using point-to-point (P2P) communications without involving the host computer 102. For example, instead of first loading the data to the host memory 110 and then sending the data to the FPGA DRAM 114' to initiate the sort, the FPGA 106' may directly access the SSD 104' to read the array elements. After sorting, the sorted segment is stored on the FPGA DRAM 114', and the next segment may be loaded and sorted. P2P communications between the FPGA 106' and the SSD 104' via the direct interconnect 702 may reduce or eliminate the overhead of writing to and reading from the host memory 110, and may reduce operational latency by removing or reducing the overhead associated with communicating through the host computer 110.

According to an embodiment of the present disclosure, by bringing computations closer to the storage device, input/output (IO) costs may be reduced, and system scalability in terms of managing larger storage systems may be increased. For example, scalability for managing larger storage systems with multiple SSDs may typically be limited by the requirement of large host memory, CPU overhead of reading data, and sharing PCI bandwidth among the resources. By using P2P communications over the direct interconnect 702, system scalability may be increased by removing or mitigating such bottlenecks. Further, P2P communications over the direct interconnect 702 may be especially useful for external sort, which may be used when the data being sorted does not fit into the main memory (e.g., usually DRAM) of a computing device (e.g., the host computer 102), such that the data is migrated into a slower external storage, for example, such as the SSD 104'. For an external sort that may require multiple reads and writes to the SSD 104', the reduced data access latency may improve the utilization of computing resources within the FPGA 106'.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of example embodiments of the present disclosure, and is not to be construed as limiting thereof. Although some example embodiments of the present invention have been disclosed for illustrative purposes, those skilled in the art will appreciate that various modifications, additions, and/or substitutions may be possible to the various embodiments, all without departing from the spirit and scope of the present invention as disclosed in the accompanying claims, and their equivalents.

What is claimed is:

1. A storage system comprising:
   a storage device configured to store an array of data elements associated with a sort operation;
   a storage interface configured to facilitate communications between the storage device and a host computer; and
   a reconfigurable processing device communicably connected to the storage device, the reconfigurable processing device comprising:
   memory configured to store input data read from the storage device, the input data corresponding to the array of data elements stored in the storage device; and
   a kernel comprising one or more compute components configured to execute the sort operation on the input data stored in the memory according to a SORT command received from the host computer,
   wherein the reconfigurable processing device is configured to dynamically instantiate the one or more compute components according to a comparison of a size of the input data with one or more threshold sizes to accelerate the sort operation.

2. The storage system of claim 1, wherein the reconfigurable processing device comprises a field programmable gate array (FPGA), and the storage device comprises a solid state drive (SSD).

3. The storage system of claim 2, wherein the input data is read from the SSD by the host computer and loaded into primary memory of the host computer, and the memory of the FPGA is configured to receive the input data from the primary memory of the host computer.

4. The storage system of claim 2, further comprising a direct interconnect between the memory and the SSD, and the FPGA is configured to directly access the SSD to read the input data from the SSD to the memory via the direct interconnect.

5. The storage system of claim 4, wherein the FPGA and the SSD are implemented on the same circuit board.

6. The storage system of claim 4, wherein the FPGA is configured to access the SSD via the direct interconnect using point-to-point (P2P) communications to bypass the host computer when reading data from the SSD.

7. The storage system of claim 4, wherein the memory comprises dynamic random-access memory (DRAM).

8. The storage system of claim 1, wherein the one or more compute components comprises a plurality of processing elements, and each of the plurality of processing elements is configured to sort a segment of the array of data elements corresponding to the input data according to a sorting algorithm.

9. A storage system comprising:
a storage device configured to store an array of data elements associated with a sort operation;
a storage interface configured to facilitate communications between the storage device and a host computer; and
a reconfigurable processing device communicably connected to the storage device, the reconfigurable processing device comprising:
memory configured to store input data read from the storage device, the input data corresponding to the array of data elements stored in the storage device; and
a kernel comprising one or more compute components configured to execute the sort operation on the input data stored in the memory according to a SORT command received from the host computer,
wherein the reconfigurable processing device is configured to dynamically instantiate the one or more compute components to accelerate the sort operation,
wherein the one or more compute components comprises a plurality of processing elements, and each of the plurality of processing elements is configured to sort a segment of the array of data elements corresponding to the input data according to a sorting algorithm, and
wherein each of the processing elements comprises a local comparator and a local merger, and the local comparator and the local merger are configured to generate a partially sorted array from the segment using the sorting algorithm.

10. The storage system of claim 9, wherein the one or more compute components further comprises a processing unit connected to an output of each of the processing elements, and the processing unit is configured to sort the outputs of the processing elements according to the sorting algorithm.

11. The storage system of claim 10, wherein the processing unit comprises a global comparator and a global merger, and the global comparator and the global merger are configured to generate a fully sorted array of the input data from the partially sorted arrays output by the processing elements using the sorting algorithm.

12. The storage system of claim 11, wherein the sorting algorithm is a Bitonic sorting algorithm.

13. The storage system of claim 11, wherein the reconfigurable processing device is configured to dynamically instantiate a number of the processing elements and the processing unit at run-time according to a size of the array of data elements.

14. The storage system of claim 13, wherein the reconfigurable processing device is configured to:
identify a size of the array of data elements;
compare the size of the array of data elements with one or more threshold sizes; and
instantiate the number of processing elements and the processing unit according to the comparison.

15. A method for dynamically scaling a sort operation for a storage system comprising a storage device to store an array of data elements associated with a sort operation, a storage interface to facilitate communications between the storage device and a host computer, and a reconfigurable processing device communicably connected to the storage device, the method comprising:
identifying, by the reconfigurable processing device, a size of the array of data elements associated with a sort command from the host computer;
comparing, by the reconfigurable processing device, the size with one or more threshold sizes; and
instantiating, by the reconfigurable processing device, one or more compute components according to the comparison to accelerate the sort operation.

16. The method of claim 15, wherein the reconfigurable processing device comprises a field programmable gate array (FPGA), and the storage device comprises a solid state drive (SSD).

17. The method of claim 16, wherein the instantiating of the one or more compute components comprises reconfiguring one or more logic blocks and one or more interconnects of a kernel of the FPGA.

18. The method of claim 16, wherein the instantiating of the one or more compute components comprises instantiating, by the reconfigurable processing device, at least one local sort compute component, and
wherein the method further comprises:
sorting, by the at least one local sort compute component, at least a segment of the array of data elements; and
generating, by the at least one local sort compute component, a sorted array of the at least the segment.

19. The method of claim 16, wherein the instantiating of the one or more compute components comprises instantiating, by the reconfigurable processing device, a plurality of local sort compute components, and
wherein the method further comprises:
sorting, by each of the local sort compute components, a different segment of the array of data elements; and
generating, by each of the local sort compute components, a partially sorted array of the corresponding segment.

20. The method of claim 19, wherein the instantiating of the one or more compute components further comprises instantiating, by the reconfigurable processing device, a global sort compute component connected to outputs of each of the local sort compute components, and
wherein the method further comprises:
sorting, by the global sort compute component, the partially sorted array generated by each of local sort compute components; and
generating, by the global sort compute component, a fully sorted array corresponding to the array of data elements from the sorting of the partially sorted arrays.

* * * * *